(12) United States Patent
Eldada et al.

(10) Patent No.: US 10,126,412 B2
(45) Date of Patent: Nov. 13, 2018

(54) OPTICAL PHASED ARRAY LIDAR SYSTEM AND METHOD OF USING SAME

(71) Applicants: Louay Eldada, Sunnyvale, CA (US); Tianyue Yu, Sunnyvale, CA (US); Angus Pacala, Menlo Park, CA (US)

(72) Inventors: Louay Eldada, Sunnyvale, CA (US); Tianyue Yu, Sunnyvale, CA (US); Angus Pacala, Menlo Park, CA (US)

(73) Assignee: Quanergy Systems, Inc., Sunnyvale, CA (US)

( * ) Notice: Subject to any disclaimer, the term of this patent is extended or adjusted under 35 U.S.C. 154(b) by 0 days.

(21) Appl. No.: 14/279,348

(22) Filed: May 16, 2014

(65) Prior Publication Data

US 2016/0161600 A1    Jun. 9, 2016

Related U.S. Application Data

(60) Provisional application No. 61/867,574, filed on Aug. 19, 2013.

(51) Int. Cl.
*G01C 3/08* (2006.01)
*G01S 7/481* (2006.01)
(Continued)

(52) U.S. Cl.
CPC .......... *G01S 7/4818* (2013.01); *G01S 7/4813* (2013.01); *G01S 7/4814* (2013.01); *G01S 7/4863* (2013.01);
(Continued)

(58) Field of Classification Search
CPC .... G01S 17/023; G01S 17/936; G01S 7/4863; G01S 7/4818; G01S 7/4814
(Continued)

(56) References Cited

U.S. PATENT DOCUMENTS 3,781,552 A    12/1973    Kadrmas
5,132,843 A    7/1992    Aoyama et al.
(Continued)

OTHER PUBLICATIONS

Guo et al., "InP Photonic Integrated Circuit for 2D Optical Beam Steering", Photonics Conference, Oct. 9-13, 2011, Arlington, VA, IEEE, 2011, 3 pgs.
(Continued)

*Primary Examiner* — Mark Hellner
(74) *Attorney, Agent, or Firm* — Cooley LLP

(57) ABSTRACT

A lidar-based system and method are used for the solid state beamforming and steering of laser beams using optical phased array (OPA) photonic integrated circuits (PICs) and the detection of laser beams using photodetectors. Transmitter and receiver electronics, power management electronics, control electronics, data conversion electronics and processing electronics are also included in the system and used in the method.
Laser pulses beamformed by the OPA PIC reflect from objects in the field of view (FOV) of said OPA, and are detected by a detector or a set of detectors.
A lidar system includes at least one lidar, and any subset and any number of complementary sensors, data processing/communication/storage modules, and a balance of system for supplying power, protecting, connecting, and mounting the components of said system.
Direct correlation between the 3D point cloud generated by the lidar and the color images captured by an RGB (Red, Green, Blue) video camera can be achieved by using an optical beam splitter that sends optical signals simultaneously to both sensors.
A lidar system may contain a plurality of lidar sensors, a lidar sensor may contain a plurality of optical transmitters, and an optical transmitter may contain a plurality of OPA PICs.

15 Claims, 5 Drawing Sheets

(51) Int. Cl.
  *G01S 17/02* (2006.01)
  *G01S 17/93* (2006.01)
  *G01S 7/486* (2006.01)
  *G01S 17/89* (2006.01)
  *G01S 13/86* (2006.01)

(52) U.S. Cl.
  CPC ............ *G01S 17/023* (2013.01); *G01S 17/89* (2013.01); *G01S 17/936* (2013.01); *G01S 13/865* (2013.01)

(58) Field of Classification Search
  USPC ...................................................... 356/5.01
  See application file for complete search history.

(56) References Cited

U.S. PATENT DOCUMENTS

| | | |
|---|---|---|
| 5,210,586 A | 5/1993 | Grage et al. |
| 5,455,669 A | 10/1995 | Wetteborn |
| 5,543,805 A * | 8/1996 | Thaniyavarn ........ H01Q 3/2676 342/368 |
| 5,552,893 A | 9/1996 | Akasu |
| 5,682,229 A | 10/1997 | Wangler |
| 5,898,483 A | 4/1999 | Flowers |
| 6,765,663 B2 * | 7/2004 | Byren .................... G01B 11/26 250/342 |
| 6,891,987 B2 * | 5/2005 | Ionov .................... G02F 1/292 342/368 |
| 7,746,449 B2 | 6/2010 | Ray et al. |
| 7,969,558 B2 * | 6/2011 | Hall ....................... G01S 7/4813 356/141.5 |
| 8,125,367 B2 | 2/2012 | Ludwig |
| 8,203,115 B2 | 6/2012 | Hochberg et al. |
| 8,311,374 B2 * | 11/2012 | Hochberg ............. G01S 7/4814 385/14 |
| 8,731,247 B2 * | 5/2014 | Pollock ................. G01C 11/02 382/108 |
| 8,836,922 B1 * | 9/2014 | Pennecot ............... G01S 17/89 356/28 |
| 8,988,754 B2 * | 3/2015 | Sun ........................ G02B 6/26 359/238 |
| 9,014,903 B1 | 4/2015 | Zhu |
| 9,069,080 B2 | 6/2015 | Stettner et al. |
| 9,104,086 B1 | 8/2015 | Davids et al. |
| 9,332,243 B2 * | 5/2016 | Klusza ............... H04N 13/0207 |
| 9,383,753 B1 | 7/2016 | Templeton et al. |
| 2005/0033497 A1 | 2/2005 | Stopczynski |
| 2006/0091303 A1 * | 5/2006 | Evans ................. G01N 21/0303 250/227.25 |
| 2006/0197936 A1 | 9/2006 | Libeman et al. |
| 2006/0239688 A1 | 10/2006 | Hillis et al. |
| 2007/0052947 A1 | 3/2007 | Ludwig et al. |
| 2007/0065002 A1 * | 3/2007 | Marzell ................... G06T 17/00 382/154 |
| 2007/0181810 A1 | 8/2007 | Tan et al. |
| 2008/0094607 A1 | 4/2008 | Bernard et al. |
| 2008/0186470 A1 | 8/2008 | Hipp |
| 2008/0204699 A1 | 8/2008 | Benz et al. |
| 2008/0227292 A1 | 9/2008 | Miki |
| 2009/0059201 A1 * | 3/2009 | Willner ................... G01S 7/491 356/5.01 |
| 2009/0251680 A1 * | 10/2009 | Farsaie .................... G01C 3/08 356/3 |
| 2009/0278030 A1 | 11/2009 | Deliwala |
| 2010/0045964 A1 | 2/2010 | Jin et al. |
| 2010/0187402 A1 * | 7/2010 | Hochberg .......... G02B 6/12004 250/208.1 |
| 2010/0187442 A1 * | 7/2010 | Hochberg ............. G01S 7/4814 250/492.1 |
| 2010/0253585 A1 | 10/2010 | Llorens del Rio et al. |
| 2010/0271614 A1 | 10/2010 | Albuquerque et al. |
| 2010/0290029 A1 | 11/2010 | Hata |
| 2011/0216304 A1 | 9/2011 | Hall |
| 2011/0222814 A1 | 9/2011 | Krill et al. |
| 2011/0255070 A1 | 10/2011 | Phillips et al. |
| 2011/0316978 A1 * | 12/2011 | Dillon ................ G01B 11/2513 348/46 |
| 2012/0013962 A1 * | 1/2012 | Subbaraman .......... B82Y 20/00 359/15 |
| 2012/0226118 A1 | 9/2012 | Delbeke et al. |
| 2012/0286136 A1 * | 11/2012 | Krill ...................... G01S 17/42 250/206 |
| 2013/0027715 A1 | 1/2013 | Imaki et al. |
| 2013/0044309 A1 * | 2/2013 | Dakin .................... G01S 7/4814 356/4.09 |
| 2013/0114924 A1 | 5/2013 | Loh et al. |
| 2013/0127980 A1 | 5/2013 | Haddick |
| 2013/0208256 A1 * | 8/2013 | Mamidipudi ......... G01S 7/4811 356/4.01 |
| 2013/0242400 A1 * | 9/2013 | Chen ...................... G01S 17/42 359/618 |
| 2013/0301976 A1 | 11/2013 | Saida et al. |
| 2014/0152871 A1 | 6/2014 | Campbell |
| 2014/0211194 A1 | 7/2014 | Pacala |
| 2014/0240691 A1 | 8/2014 | Mheen |
| 2014/0376001 A1 | 12/2014 | Swanson |
| 2015/0192677 A1 | 7/2015 | Yu |
| 2015/0293224 A1 | 10/2015 | Eldada |
| 2015/0346340 A1 | 12/2015 | Yaacobi |
| 2015/0378241 A1 | 12/2015 | Eldada |
| 2016/0047901 A1 | 2/2016 | Pacala |
| 2016/0049765 A1 | 2/2016 | Eldada |

OTHER PUBLICATIONS

Guo et al., "Two-Dimensional optical Beam Steering with InP-Based Photonic Integrated Circuits", IEEE Journal of Selected Topics in Quantum Electronics, vol. 19, No. 4, Aug. 2013, pp. 1, 6, 8, 11.

Hulme et al., "Fully Integrated Hybrid Silicon Free-Space Beam Steering Source with 32 Channel Phased Array", SPIE, Mar. 26, 2014, pp. 898907-2, 898907-13.

Taillaert et al., "An Out-Of-Plane Grating Coupler for Efficient Butt-Coupling Between Compact Planar Waveguides and Single-Mode Fibers", IEEE Journal of Quantum Electronics, vol. 38, No. 7, Jul. 2002, pp. 951-953.

International Search Report and Written Opinion issued to International Patent Application No. PCT/US15/44069, Nov. 12, 2015, 9 pgs.

Van Acoleyen, Karel, "Nanophotonic Beamsteering Elements Using Silicon Technology for Wireless Optical Applications", Ghent University, Dept. of Information Technology, Aug. 27, 2012, 180 pgs.

Van Acoleyen, Karel, "Off-Chip Beam Steering with a One-Dimensional Optical Phased Array on Silicon-On-Insulator", Optics Letters, vol. 34, No. 9, May 1, 2009, pp. 1477-1479.

International Search Report and Written Opinion issued to international patent application No. PCT/US15/56516, Feb. 4, 2016, 7 pgs.

* cited by examiner

OPTICAL PHASED ARRAY LIDAR SYSTEM AND METHOD OF USING SAME

PRIORITY CLAIM

The present application claims the benefit of priority from U.S. Provisional Application Ser. No. 61/867,574, filed Aug. 19, 2013.

REFERENCES CITED

| U.S. Patent Documents | | |
| --- | --- | --- |
| 7,339,727 B1 | March 2008 | Rothenberg |
| 7,406,220 B1 | July 2008 | Christensen |
| 7,428,100 B2 | September 2008 | Smith |
| 7,436,588 B2 | October 2008 | Rothenberg |
| 7,489,870 B2 | February 2009 | Hillis |
| 7,532,311 B2 | May 2009 | Henderson |
| 7,555,217 B2 | July 2009 | Hillis |

FIELD OF THE INVENTION

The present invention relates generally to the field of environment sensing, and more particularly to the use of Time of Flight (ToF) lidar sensors for real-time three-dimensional mapping and object detection, tracking, identification and/or classification.

BACKGROUND OF THE INVENTION

A lidar sensor is a light detection and ranging sensor. It is an optical remote sensing module that can measure the distance to a target or objects in a scene, by irradiating the target or scene with light, using pulses (or alternatively a modulated signal) from a laser, and measuring the time it takes photons to travel to said target or landscape and return after reflection to a receiver in the lidar module. The reflected pulses (or modulated signals) are detected, with the time of flight and the intensity of the pulses (or modulated signals) being measures of the distance and the reflectivity of the sensed object, respectively.

Conventional lidar sensors utilize mechanically moving parts for scanning laser beams. In some systems, including certain systems used in automotive applications, such as advanced driver assist systems (ADAS) and autonomous driving systems, it is preferred to use solid state sensors for a variety of potential advantages including but not limited to higher sensor reliability, longer sensor lifetime, smaller sensor size, lower sensor weight, and lower sensor cost.

Radio frequency (RF) delay lines used for the creation of radar phased arrays were used several decades ago for the solid state steering of radar signals. Photonic integrated circuit (PIC) based delay lines combined with detectors and RF antenna arrays were used two decades ago to improve the precision of delays in the solid state steering of radar signals. PICs with microscale and nanoscale devices can be used to produce optical phased arrays (OPAs), comprising tunable optical delay lines and optical antennas, for the solid state steering of laser beams. Phased Arrays in the optical domain that are produced to date are complex, costly and/or have a different purpose than beam forming and beam steering; some combine spatial filters, optical amplifiers and ring lasers (U.S. Pat. No. 7,339,727), some involve a plurality of optical input beams (U.S. Pat. No. 7,406,220), some involve volume diffraction gratings and a plurality of input directions (U.S. Pat. No. 7,428,100), some combine beams of a plurality of wavelengths (U.S. Pat. No. 7,436,588), some have optical phase reference sources and gain elements (U.S. Pat. No. 7,489,870), some have predetermined areas in the field of view and a plurality of beam forming elements (U.S. Pat. No. 7,532,311), and some have multiple frequencies and multiple optical phase reference sources (U.S. Pat. No. 7,555,217).

SUMMARY OF THE INVENTION

A lidar-based system and method are used for the solid state beamforming and steering of laser beams using OPA PICs and the detection of laser beams using photodetectors. Transmitter and receiver electronics, power management electronics, control electronics, data conversion electronics and processing electronics are also included in the system and used in the method.

Laser pulses beamformed by the OPA PIC reflect from objects in the field of view (FOV) of said OPA, and are detected by a detector or a set of detectors.

A lidar system includes at least one lidar, and any subset and any number of complementary sensors, data processing/communication/storage modules, and a balance of system for supplying power, protecting, connecting, and mounting the components of said system.

Direct correlation between the 3D point cloud generated by the lidar and the color images captured by an RGB (Red, Green, Blue) video camera can be achieved by using an optical beam splitter that sends optical signals simultaneously to both sensors.

A lidar system may contain a plurality of lidar sensors, a lidar sensor may contain a plurality of optical transmitters, and an optical transmitter may contain a plurality of OPA PICs.

DESCRIPTION OF THE DRAWINGS

The following drawings are illustrative of embodiments of the present invention and are not intended to limit the invention as encompassed by the claims forming part of the application.

The schematic diagram of FIG. 1 provides a frontal view of a solid state lidar sensor 10 that can be implemented using the present invention, depicting an OPA-comprising transmitter 20, a receiver 30, a processor 40 and one or a plurality of printed circuit boards 50 comprising control electronics. A solid state lidar sensor 10 may contain a plurality of optical transmitters 20, and an optical transmitter 20 may contain a plurality of OPA PICs.

Figure 1:
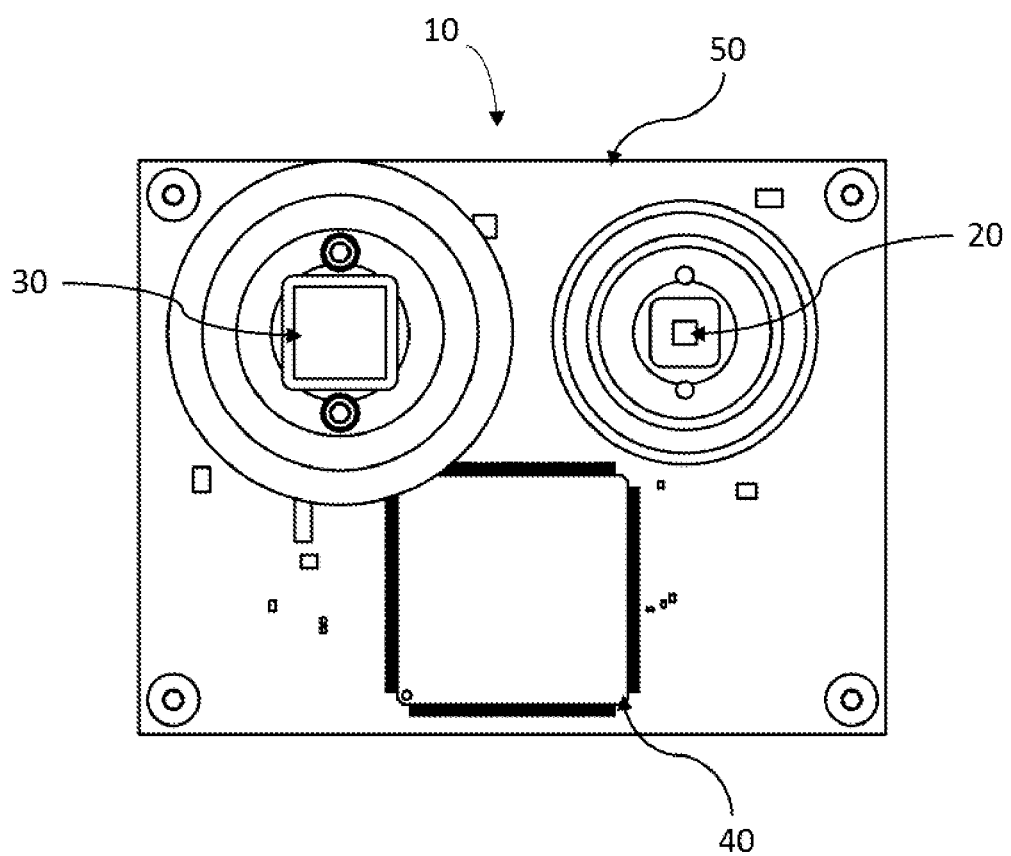
Figure 2:
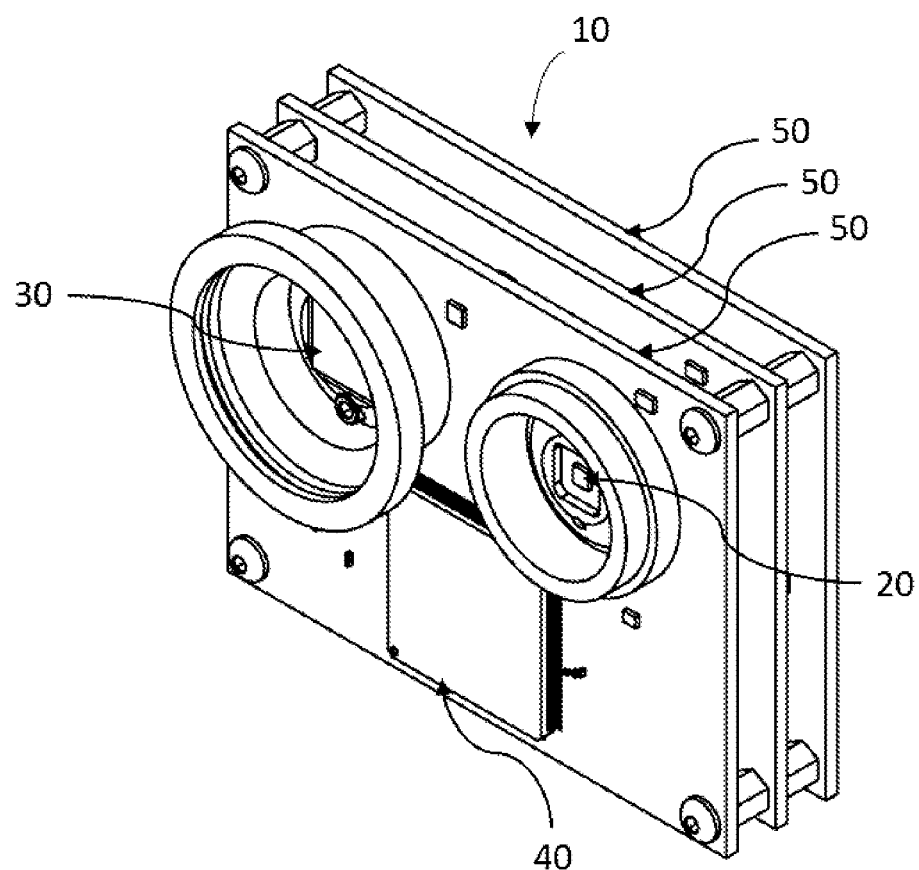

The schematic diagram of FIG. 2 provides an angled view of a solid state lidar sensor 10 that can be implemented using the present invention, depicting an OPA-comprising transmitter 20, a receiver 30, a processor 40 and one or a plurality of printed circuit boards 50 including control electronics.

Figure 3:
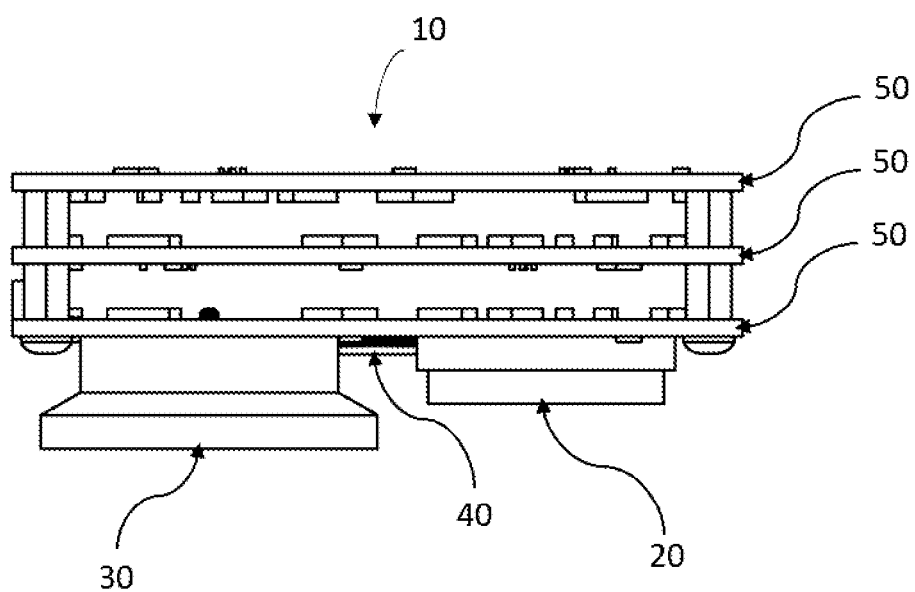

The schematic diagram of FIG. 3 provides a top view of a solid state lidar sensor 10 that can be implemented using the present invention, depicting an OPA-comprising transmitter 20, a receiver 30, a processor 40 and one or a plurality of printed circuit boards 50 including control electronics.

Figure 4:
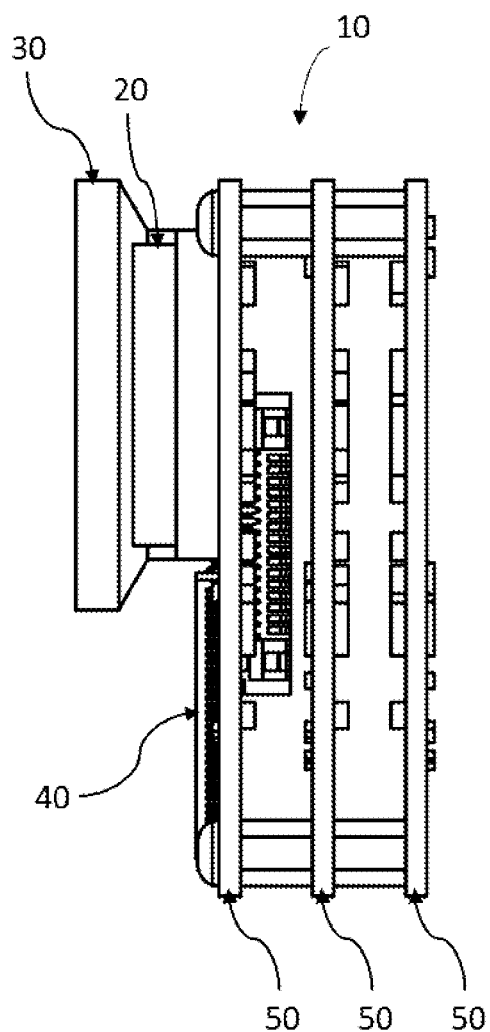

The schematic diagram of FIG. 4 provides a side view of a solid state lidar sensor 10 that can be implemented using the present invention, depicting an OPA-comprising transmitter 20, a receiver 30, a processor 40 and one or a plurality of printed circuit boards 50 including control electronics.

Figure 5:
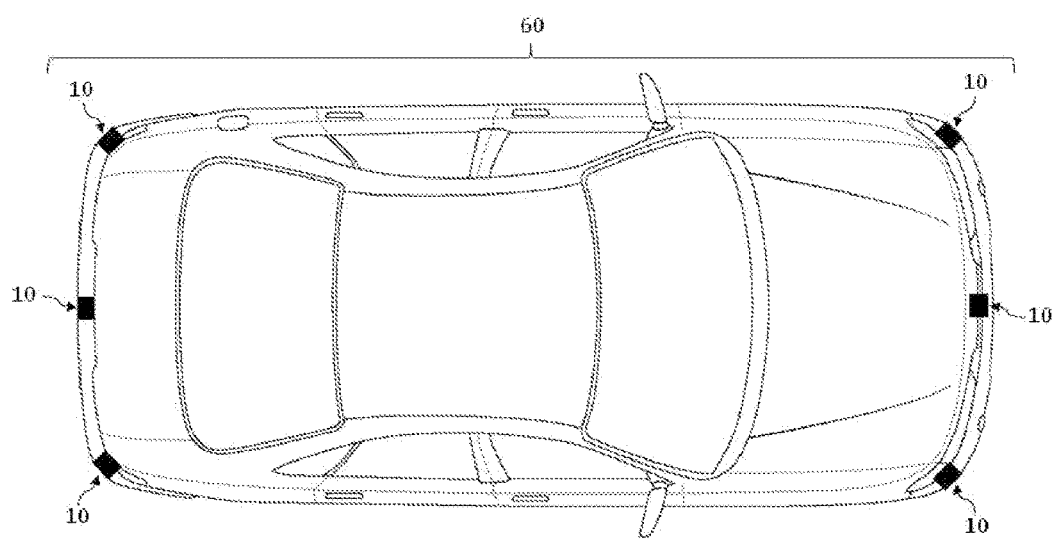

The schematic diagram of FIG. 5 provides a view of a vehicle-mounted lidar system 60 that contains a plurality of lidar sensors 10.

DETAILED DESCRIPTION OF THE INVENTION

A lidar-based system and method are used for the solid state beamforming and steering of laser beams using OPA PICs and the detection of laser beams using photodetectors. Transmitter and receiver electronics, power management electronics, control electronics, data conversion electronics and processing electronics are also included in the system and used in the method.

Microfabrication and/or nanofabrication techniques are used for the production of OPA PICs that include optical power splitters that distribute an optical signal from a laser, optical-fiber-coupled to the chip or integrated on the chip, to tunable optical delay lines for phase control, and said delay lines direct their output optical signals to optical antennas for out-of-plane coupling of light.

For each set of settings for the tuning elements (e.g., ohmic heating electrodes) of said delay lines, said optical antennas emit light beams with specific phase delays, forming a desired far-field radiation pattern through the interference of said emitted beams.

Settings of said tuning elements of said delay lines can be varied to generate by 'random access' any sequence of far-field radiation patterns. In a specific embodiment, the far-field radiation pattern essentially maintains its shape as it is moved to any desired sequence of locations; in a more specific embodiment, said far-field radiation pattern whose shape is kept essentially constant is swept in the far field to form a rastered line (e.g., a serpentine line).

In a TOF lidar application, a OPA-based lidar includes an optical transmitter (including laser, laser driver, laser controller, OPA PIC, and OPA controller), an optical receiver (including photodetector(s), photodetector driver(s), and receiver electronics), and electronics for power regulation, control, data conversion, and processing.

Photodetector types include avalanche photodiodes (APD) and PIN diodes (PIN diodes are positive-intrinsic-negative diodes, as they comprise a lightly-doped intrinsic semiconductor region between a a-type or positive-type semiconductor region and an n-type or negative-type semiconductor region).

Laser pulses beamformed by the OPA PIC reflect from objects in the field of view (FOV) of said OPA, and are detected by a detector or a set of detectors (including 1 D and 2D detector arrays). Detector arrays include staring arrays, staring-plane arrays, or focal-plane arrays (FPA), which consist of an array (typically 2D) of light-sensing pixels at the focal plane of a lens. The light-sensing pixels can be single-photon avalanche diodes (SPADs).

The OPA PIC is preferably compatible with a complementary metal-oxide-semiconductor (CMOS) process, and is preferably based on a silicon on insulator (SOI) structure. The OPA PIC may contain optical waveguiding elements composed of crystalline silicon, amorphous silicon and/or silicon nitride.

When the OPA PIC is based on a CMOS (complementary metal-oxide-semiconductor) process, it can be integrated with optoelectronics and/or electronics that are part of the same lidar (including but not limited to any number of lasers, laser drivers, laser controllers, optical amplifiers, optical detectors, receiver electronics, power regulation electronics, control electronics, data conversion electronics, data processing electronics) and are based on a CMOS process or can be hybridly integrated with CMOS technology.

A lidar system includes at least one lidar, and any subset and any number of the following:
  Complementary sensors
    GPS (Global Positioning System) or GNSS (Global Navigation Satellite System) receiver
    IMU (Inertial Measurement Unit)
    Wheel encoder
    Video camera (visible and/or IR)
    Radar
    Ultrasonic sensor
  Data processing/communication/storage modules
    Embedded processor
    Ethernet controller
    Cell modem
    Wi-Fi controller
    Data storage drive
    HMI (Human Machine Interface) e.g., display, audio, buzzer
  Balance of system
    Power supply
    Enclosure
    Cabling
    Mounting hardware Direct correlation between the 3D point cloud generated by the lidar and the color images captured by an RGB (Red, Green, Blue) video camera can be achieved by using an optical beam splitter that sends optical signals simultaneously to both sensors, simplifying the sensor fusion that generates a color point cloud or RGBD data (Red, Green, Blue and Depth). The OPA PIC, optical receiver and/or RGB video camera can be integrated on a single printed circuit board (PCB).

For reasons including but not limited to redundancy and widening the field of view, a lidar system may contain a plurality of lidar sensors, a lidar sensor may contain a plurality of optical transmitters, and an optical transmitter may contain a plurality of OPA PICs.

What is claimed is:

1. An apparatus, comprising:
   a transmitter to transmit out-of-plane light, wherein the out-of-plane light has specific phase delays that form a desired far-field radiation pattern through the interference of emitted beams;
   a receiver with an optical intensity beam splitter used to split and send optical signals simultaneously to an optical receiver assembly of a lidar and a video camera for direct correlation between a three-dimensional point cloud generated by the far-field radiation pattern and color images captured by the video camera to form red, green, blue and depth data; and
   a printed circuit board hosting the transmitter, the receiver and an optical phased array photonic integrated circuit of the lidar.

2. The apparatus of claim 1 wherein said far-field radiation pattern is swept to form a rastered line.

3. The apparatus of claim 1 wherein the receiver includes photodetector drivers connected to photodetectors.

4. The apparatus of claim 3 wherein the photodetectors are avalanche photodiodes.

5. The apparatus of claim 3 wherein the photodetectors are positive-intrinsic-negative diodes.

6. The apparatus of claim 3 wherein the photodetectors form a staring array.

7. The apparatus of claim 3 wherein the photodetectors form a staring-plane array.

8. The apparatus of claim 3 wherein the photodetectors form a focal-plane array.

9. The apparatus of claim 3 configured as a silicon on insulator structure.

10. The apparatus of claim 1 wherein the optical intensity beam splitter is a visible and near-infrared beam splitter.

11. The apparatus of claim 10 wherein the visible and near-infrared beam splitter is a plate beam splitter.

12. The apparatus of claim 10 wherein the visible and near-infrared beam splitter is a cube beam splitter.

13. The apparatus of claim 10 wherein the visible and near-infrared beam splitter is a prism beam splitter.

14. The apparatus of claim 10 wherein the visible and near-infrared beam splitter is a pellicle beam splitter.

15. The apparatus of claim 10 wherein the visible and near-infrared beam splitter is a partially-metallized mirror.

* * * * *